United States Patent [19]

Schreiner

[11] Patent Number: 5,247,786
[45] Date of Patent: Sep. 28, 1993

[54] HIGH SPEED TWO-DRUM ROW UNIT FOR A COTTON HARVESTER

[76] Inventor: Joel M. Schreiner, 913 SE. 10th, Ankeny, Iowa 50021

[21] Appl. No.: 849,925

[22] Filed: Mar. 12, 1992

[51] Int. Cl.$^5$ ............................................. A01D 46/16
[52] U.S. Cl. ........................................... 56/41; 56/43; 56/47
[58] Field of Search .................... 56/41, 33, 34, 43, 44, 56/47, 50

[56] References Cited

U.S. PATENT DOCUMENTS

| | | |
|---|---|---|
| Re. 32,699 | 6/1988 | Fachini ................................... 56/44 |
| 3,088,262 | 5/1963 | Graham . | 
| 3,354,625 | 11/1967 | Taylor et al. ........................... 56/44 |
| 3,512,346 | 5/1970 | Mecklin et al. . | 
| 4,249,365 | 2/1981 | Hubbard et al. ...................... 56/13.2 |
| 4,821,497 | 4/1989 | Deutsch et al. ......................... 56/41 |
| 4,928,459 | 5/1990 | Thedford et al. ..................... 56/13.3 |

*Primary Examiner*—Terry Lee Melius

[57] ABSTRACT

A row unit is provided which utilizes a relatively large front drum, such as a 16-bar drum and a smaller rear drum, such as a 12-bar drum. The front drum is first to contact the cotton plant and as a result picks more cotton than the rear drum. The large 16-bar drum operates with relatively low cam roller and bar loads and therefore is capable of higher speeds. A new rear drum cam orients the picker bars in such a manner as to reduce cam roller and bar loads without noticeably sacrificing picking efficiency and permits the rear drum to also operate at higher speeds. Faster ground speeds are achieved without significant increases in critical component loads. In another aspect of the invention, the axis of one of the drum cams is angled from the normal straight ahead configuration to facilitate drum placement and minimize additional row unit width. The drums are operated in an inline configuration to pick cotton from one side only of the row so that narrow row harvesting is facilitated.

15 Claims, 3 Drawing Sheets

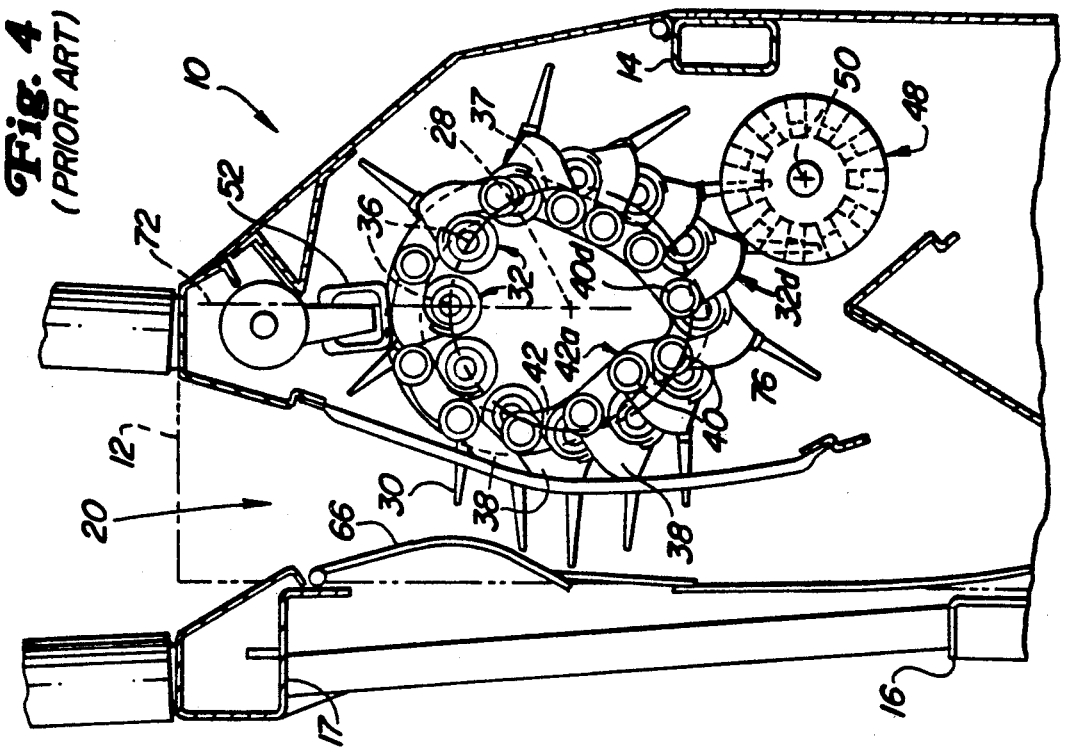
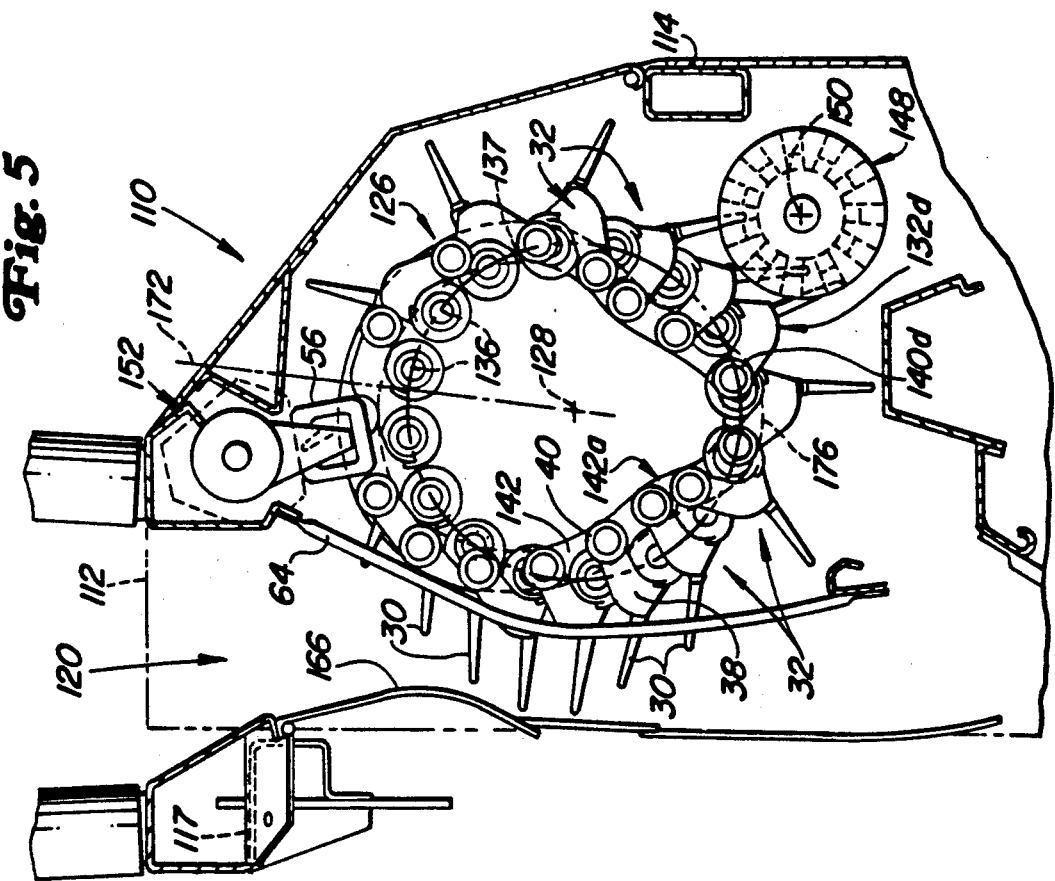

HIGH SPEED TWO-DRUM ROW UNIT FOR A COTTON HARVESTER

BACKGROUND OF THE INVENTION

1) Field of the Invention

The present invention relates generally to cotton harvesters, and more specifically to a cotton harvester row unit which is able to operate at higher speeds than most conventional row units for increased harvester productivity.

2) Related Art

In the past, cotton harvesters of the spindle type such as the John Deere model 9910 Cotton Picker included row units with front and rear picker drums located to pick cotton from the opposite sides of the row. The forward drum typically included 16 upright bars of spindles and the rear drum had 12 bars of spindles. This configuration of drums required a relatively wide housing which limited the harvester to harvesting only two widely spaced (38 or 40 inches) rows. To accommodate simultaneous harvesting of four rows of cotton, units were designed with front and rear 12-bar drums picking from opposite sides of the row, but these units also required the wide row spacings.

More recently, narrow row cotton harvesters have been available commercially which are capable of harvesting four or more rows of cotton spaced as narrowly as 30 inches. One type of narrow row harvester, exemplified by the Case-IH model 2055 Cotton Picker, has nested units with two 12-bar drums on opposite sides of the row. A second type of narrow row harvester, exemplified by the John Deere model 9960 Cotton Picker, utilizes two 12-bar drums located on the same side of the row. To improve picking efficiency and doffing in tough high yield conditions, the cam which controls the movement of the bars is designed to maximize the time that the spindles are in the row and under the doffers. Such time maximization, however, requires high angular acceleration of the bar about its axis in the transition area between the row-receiving area and the doffers and significantly increases the cam roller and picker bar loads so that the speed at which the 12-bar drums can operate is limited. The maximum drum speed determines the maximum ground speed of the harvester since ideally the forward ground speed and the rearward spindle speed in the row are identical; therefore, the harvesting speed on present pickers is limited by the drum loading. Increasing drum size to reduce loading has heretofore been avoided, especially in narrow row units, in part because of space and front end weight constraints.

BRIEF SUMMARY OF THE INVENTION

It is therefore an object of the present invention to provide an improved row unit for a cotton harvester. It is another object to provide such a unit which is capable of operating at higher speeds than at least most presently available units. It is still a further object to provide such a unit which operates with lower cam roller and bar loads.

It is yet another object of the present invention to provide an improved row unit for harvesting narrow row cotton. It is yet another object to provide such a unit which is operable at higher speeds than most conventional units without excessive loading on the drums.

It is a further object of the invention to provide an improved cotton harvester row unit of the type having a pair of drums located on one side only of the row. It is another object to provide such a row unit which can be operated at higher speeds than conventional row units and with little or no additional loading on components such as the picker bars and cam rollers. It is yet another object to provide such a row unit wherein the unit size is not significantly increased over conventional narrow row units.

A row unit is provided which utilizes a relatively large front drum, such as a 16-bar drum and a smaller rear drum, such as a 12-bar drum. The front drum is first to contact the cotton plant and as a result picks more cotton than the rear drum. The large front drum operates with relatively low cam roller and bar loads and therefore is capable of higher speeds. The larger front drum also reduces constraints on the cam design so that picking efficiency and doffing efficiency are improved. The new rear drum cam orients the picker bars in such a manner as to reduce cam roller and bar loads with little or no noticeable sacrifice of picking efficiency. The reduced loading permits the rear drum to also operate at higher speeds. The resulting higher speed capability increases productivity of the picker.

In another aspect of the invention, the drums are operated in an in-line configuration to pick cotton from one side only of the row for harvesting narrow row cotton. The axis of one of the drum cams is angled relative to the other cam axis to facilitate component placement for maintaining relatively small row unit size. In the embodiment shown, the front drum cam is angled outwardly from the forward direction by about seven degrees. A corresponding angular change of position of the doffer column relative to the conventional location is provided to maintain a sufficiently narrow row unit profile for harvesting cotton planted in 30-inch rows.

These and other objects, features and advantages of the present invention will become apparent to one skilled in the art upon reading the following detailed description in view of the drawings.

BRIEF DESCRIPTION OF THE DRAWINGS

FIG. 4 is an enlarged top view of the front drum area of the conventional row unit of FIG. 1.

FIG. 5 is an enlarged top view of the front drum area of the unit of FIG. 2.

DETAILED DESCRIPTION OF THE DRAWINGS

The Prior Art

Figures 1, 2:
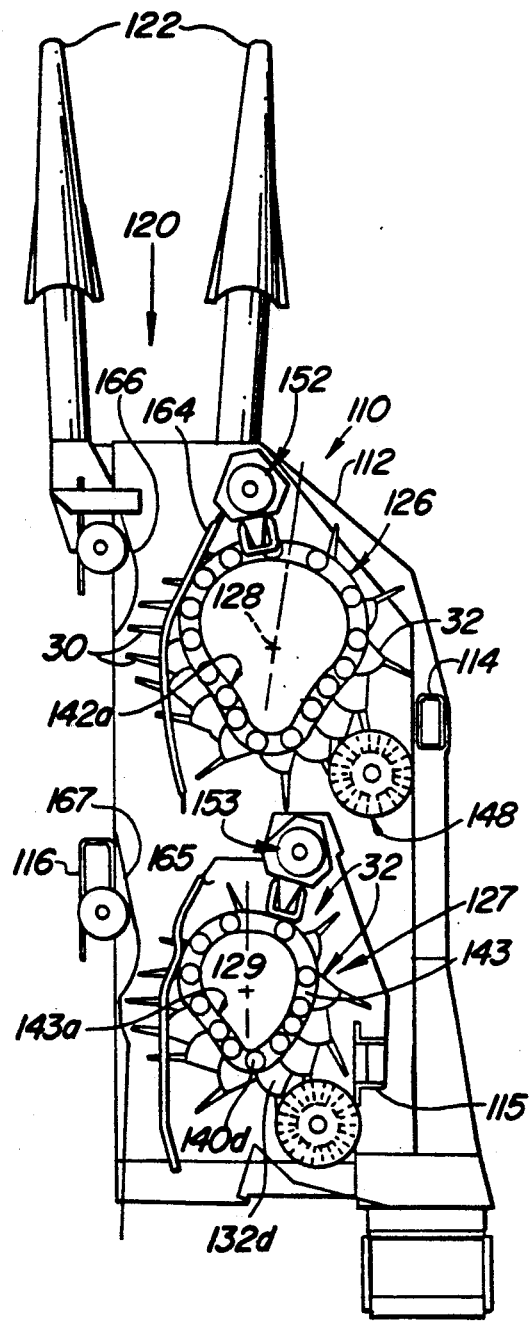
FIG. 1 is a top view of a conventional row unit typical of the prior art.
FIG. 2 is a top view of the row unit of the present invention.
Figure 3:
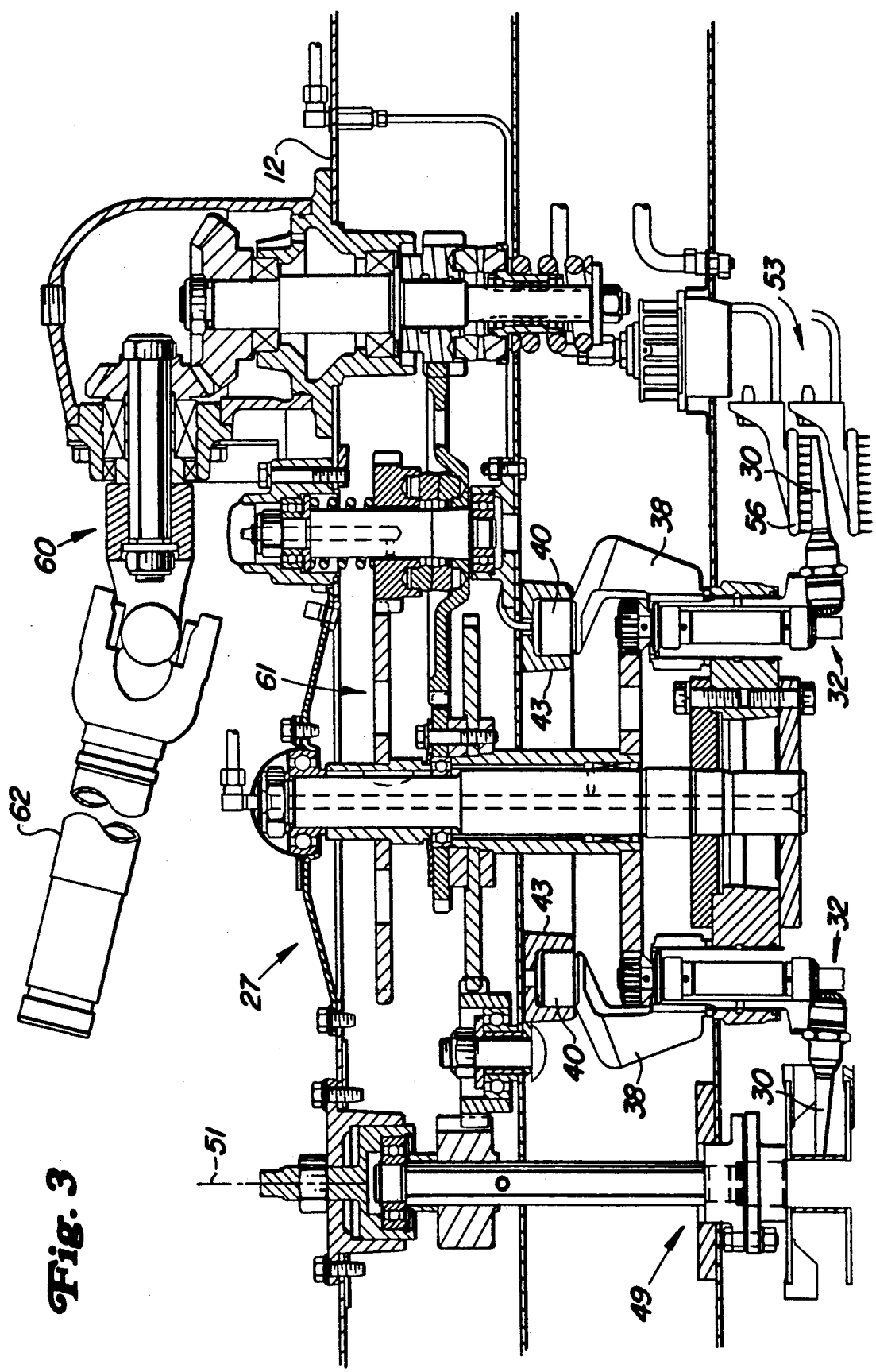
FIG. 3 is an enlarged side view, partially in section, showing part of the drive arrangement in the upper portion of a row unit.

Referring now to FIGS. 1, 3 and 4, therein is shown a conventional row unit 10 for a cotton picker. The row unit 10 includes a housing 12 with upright structural members such as at locations 14–17. A fore-and-aft extending row-receiving area 20 is defined which extends rearwardly from between a pair of stalk lifters 22 through to the rear of the housing. Front and rear upright picker drums 26 and 27 with upright rotational axes 28 and 29 are supported within the housing 12 and include spindles 30 supported in rows by a plurality of upright picker bars 32 supported the drums for rotation about upright axes 36 uniformly spaced about a circle 37 which centers on the rotational axis 28 of the drum. Each picker bar 32 includes a cam arm 38 (FIG. 3) with an upper cam roller 40 supported within the track of a cam 42 or 43 for the drum 26 or 27, respectively, which orients the bars 32 for the desired spindle position as the drum rotates about its upright axis.

Doffer columns 48 and 49 are supported for rotation about upright axes 50 and 51 parallel to and rearwardly and outwardly of the corresponding drum axes 28 and 29 for doffing cotton from the spindles. Supported adjacent the forward portion of the drums 26 and 27 are upright moistener columns 52 and 53 with pads 56 for wiping the spindles 30 after cotton is doffed therefrom.

A conventional drive mechanism indicated at 60 in FIG. 3 includes upper drive gears 61 located in the upper portion of the housing 12 to transfer power from an input shaft 62 to rotate the drums, spindles and doffers. As the drums 26 and 27 rotate, the path of the spindles 30 is controlled by the cam arrangement so that the spindles project into the rowreceiving area through grid bars 64 and 65 and rotate in contact with the cotton. As shown in the drawings, the row unit 10 is an in-line unit with the drums and drum axes on one side only of the row-receiving area so that cotton is picked from one side of the plant. Pressure plates 66 and 67 urge the plants inwardly toward the spindles 30. The spindles 30 are guided under the doffers of the doffer columns 48 and 49, and cotton is doffed from the spindles and directed rearwardly and outwardly to door structure 70 to be conveyed to the harvester basket (not shown).

As seen in FIGS. 1 and 4, the cams 42 and 43 are elongated in the fore-and-aft direction and are oriented such that each has an elongate axis (see 72 and 73 of FIG. 1 and 72 of FIG. 4) which passes through the drum axis and is parallel to the row-receiving area 20 and the forward direction. In the conventional row unit, the elongate axes 72 and 73 are generally coextensive and intersect the axes of rotation 28 and 29 of the drums 26 and 28. The cams 42 and 43 have a comma-shaped configuration with an abrupt or relatively sharp changes of direction at the tail or rearmost portion 76. As the drums rotate, the cam configuration causes the spindle bar 32d near the rear of the drum to accelerate quickly and rotate about the bar axis through a transition area (between the row-receiving area and the doffer column) and into a position wherein the doffers can start to unwind cotton from the spindles 32. As best seen in FIGS. 1 and 4, the roller 40d of the bar 32d has just passed the cam axis and the rearmost area of the portion 76 and has begun to move forwardly in the cam path when the bar 32d is positioned for doffing. The abrupt direction change beginning at location 42a of the portion 76 causes severe cam roller and bar loading at high drum speeds.

DESCRIPTION OF THE INVENTION

Referring now to FIGS. 2 and 5, the improved row unit 110 will be described in detail using numbering similar to that for the description of the prior art but with the addition of a prefix of one hundred. Also, numbering for portions of the drive arrangement and individual picker bars for the improved unit 110 will remain the same as in the prior art discussion directly above since the construction is generally identical to that shown in FIG. 3. Therefore, with a few exceptions including size and placement of the forward drum 126 and doffer 148 and the configuration of the rear cam 143, the description of the structure and operation for the unit 110 will parallel that of the unit 10.

The row unit 110 includes a housing 112 with upright structural members such as at locations 114-117. A fore-and-aft extending row-receiving area 120 is defined which extends rearwardly from between a pair of stalk lifters 122 through to the rear of the housing 112.

A relatively large front picker drum 126 and a smaller rear picker drum 127 with upright rotational axes 128 and 129, respectively, are supported within the housing 112. The rotational axis 128 of the drum 126 is offset farther outwardly from the row-receiving area 120 than the rear drum axis 129. As shown, sixteen picker bars 32 are supported by the forward drum 126 for rotation about upright axes 136 uniformly spaced about a circle 137 which centers on the rotational axis 128 of the drum. The cam 142 is larger than the corresponding cam 42 of the prior art unit 10.

The rear drum 127 is smaller in diameter and includes fewer picker bars 32 (twelve as shown in FIG. 2) than the front drum 126. The rear drum is similar in construction to the rear drum 27 of the prior art, but has the cam 143 is constructed to reduce loads by lowering the angular acceleration of the bars 32 in the transition area between the row-receiving area 120 and the doffer column.

As seen in FIGS. 2 and 5, the cams 142 and 143 are elongated in the fore-and-aft direction and are oriented such that each has an elongate axis (see 172 and 173 of FIG. 2 and 172 of FIG. 5) which passes through the drum axis. However, instead of the forward cam axis 172 being parallel to the row-receiving area 120 and the forward direction, the axis 172 is angled outwardly with respect to the axis 173 and the forward direction. The angle of the axis 172 from the forward direction is greater than about five degrees and preferably on the order of approximately seven degrees. A corresponding angular change of position of the doffer column 148 is provided (see arrow of FIG. 5) so that the column is moved rearwardly and inwardly (in the clockwise direction about the drum axis) to facilitate closer placement of housing structural member 114 to the row-receiving area. In the conventional unit (FIG. 4) the axis 50 of the doffer column 48 is closely adjacent an upright plane that passes through the rearmost extremity of the member 14, whereas in the unit of FIG. 5 the axis 150 is offset rearwardly a substantial distance from the aft extremity of the member 114. As a result, the row unit width is reduced considerably from that which would be required for the larger front drum using a conventional construction. By way of example, for a 16-bar drum the above-described construction results in a width increase of only around four inches in the housing 112 compared to that of the housing 12 for a 12-bar drum.

The forward cam 142 has a pear-shaped configuration with less severe or abrupt changes of direction near the area beginning at 142a (FIG. 3) of the tail or rearmost portion 176 (compared to the area 42a of FIG. 4). The less abrupt change reduces angular acceleration of the picker bars 32 about their axes as the drum rotates and the spindles 30 are moved from the row-receiving area toward the doffer column 148. The cam construction and the increased drum size enable higher drum speeds without high cam roller and bar loads.

The rear cam 143 (FIG. 2) also provides a less abrupt direction change at the tail end of the cam near area 143a when compared with area 43a (FIG. 1) of the prior art device. By reducing the acceleration of the picker bar in this area, cam roller and bar loads are reduced and rear drum speed can be increased. As best compared in FIGS. 1 and 2, the roller 40d of the bar 32d on the drum 27 has just passed the rearwardmost point of the portion 76 and has begun to move forwardly in the cam path when the bar 32d is positioned for doffing. However, on the drum 127, the corresponding roller 140d is at or near the rearmost portion of the cam as the bar 132d is positioned for initiation of doffing.

Having described the preferred embodiment, it will become apparent that various modifications can be made without departing from the scope of the invention as defined in the accompanying claims.

I claim:

1. In a cotton harvester for harvesting cotton planted in rows, a row unit comprising:
   a row unit housing defining a fore-and-aft extending row receiving area;
   a forward harvesting drum and a rearward harvesting drum supported by the housing for rotation about upright axes for picking cotton from a row of cotton plants;
   wherein the harvesting drums include upright spindle bars rotatable about axes parallel to the forward drum axis; and
   forward and rearward cams supported from the housing above the forward and rearward drums, respectively, for orienting the spindle bars about their axes, the cams having generally fore-and-aft extending cam axes, wherein the forward cam axis intersects and forms an acute angle of greater than approximately 5 degrees with the rearward cam axis to facilitate reduced row unit width.

2. The invention as set forth in claim 1 wherein the cam axes are offset relative to each other at an angle of about seven degrees and intersect within the row unit housing.

3. In a cotton harvester for harvesting cotton planted in rows, a row unit comprising:
   a row unit housing defining a fore-and-aft extending row receiving area;
   a forward harvesting drum and a rearward harvesting drum supported by the housing for rotation about upright axes for picking cotton from a row of cotton plants;
   wherein the harvesting drums include upright spindle bars rotatable about axes parallel to the forward drum axis;
   forward and rearward cams supported from the housing above the forward and rearward drums, respectively, for orienting the spindle bars about their axes, the cams having generally fore-and-aft extending cam axes with the forward cam axis offset at an angle relative to the rearward cam axis; and
   wherein the rear harvesting drum has fewer spindle bars than the forward drum, the spindle bars are arranged in circular configuration around the respective drum axes, and the diameter of the forward drum is greater than the diameter of the rearward drum.

4. The invention as set forth in claim 3 wherein the forward harvesting drum has at least sixteen spindle bars, and the axes of the forward and rearward drums are located on the same side of the row receiving area so that the spindles enter the cotton plants from one side only of a row.

5. In a cotton harvester for harvesting cotton planted in rows, a row unit comprising:
   a row unit housing defining a fore-and-aft extending row receiving area and having a side structural member;
   a forward and a rearward harvesting drum located on one side of the row receiving area for picking cotton from one side only of a row of cotton plants and rotatable about upright axes;
   a front cam and a rear cam offset vertically from the forward and rearward harvesting drums and defining generally fore-and-aft extending cam axes;
   a front and a rear doffer column supported adjacent the forward and rearward drums, respectively, at generally identical angular locations relative the respective cam axes;
   wherein the forward harvesting drum includes a first plurality of upright spindle bars, and the rearward harvesting drum includes a second plurality of upright spindle bars, wherein the picker bars are arranged in circular fashion on each drum, and the forward drum has a substantially larger radius than the rearward drum; and
   wherein the position of the front drum cam axis is angled relative to the fore-and-aft direction such that the front doffer column is moved inwardly from the side structural member.

6. The invention as set forth in claim 5 wherein the forward cam axis is offset at an angle with respect to the rearward cam axis.

7. The invention as set forth in claim 6 wherein the axis of the forward cam is offset, in the forward direction at an angle of at least five degrees outwardly from the row receiving area.

8. The invention as set forth in claim 7 wherein the axis of the rearward cam is parallel to the row-receiving area.

9. In a cotton harvester for harvesting cotton planted in rows, a row unit comprising:
   a row unit housing defining a fore-and-aft extending row receiving area;
   a forward and a rearward harvesting drum located on one side of the row receiving area for picking cotton from one side only of a row of cotton plants;
   wherein the forward harvesting drum includes a first plurality of upright spindle bars, and the rearward harvesting drum includes a second plurality of upright spindle bars, the second plurality being less than the first plurality, wherein the spindle bars define upright axes and are rotatable about the upright axes, and
   wherein the spindle bars include upper cam arms with rollers offset from the upright axes, forward and rearward horizontal cams located above the forward and rearward harvesting drums for receiving the rollers and rotating the spindle bars about their axes and the cam for at least one of the drums includes an aft portion for orienting the bars about their axes as the bars move away from the row-receiving area toward a doffing area, the aft portion orienting the bars such that the roller for the bar moving into the doffing area is substantially at the rearmost portion of the cam.

10. In a cotton harvester for harvesting cotton planted in rows, a row unit comprising:
    a row unit housing defining a fore-and-aft extending row receiving area;

a forward and a rearward upright harvesting drum located on one side of the row receiving area for picking cotton from one side only of a row of cotton plants in the row-receiving area, the forward and rearward drums including upright picker bars rotatable about upright axes and supporting cotton picking spindles;

doffer columns supported adjacent the drums at locations offset from the row-receiving area for doffing cotton from the spindles, the columns and the row receiving areas defining intermediate transition areas;

forward and rearward horizontal cams located above the forward and rearward drums, respectively, for orienting the spindle bars about the upright axes, the cams being elongated in the fore-and-aft direction to define generally fore-and-aft extending axes;

wherein the forward cam axis is offset at an angle with respect to the rearward cam; and wherein the picker bars are arranged in circular fashion on each drum, and wherein the forward drum has a substantially larger radius than the rearward drum.

11. The invention as set forth in claim 10 wherein the forward cam axis is offset at an angle to the row receiving area.

12. The invention as set forth in claim 10 wherein the forward drum includes substantially more spindles than the rearward drum.

13. The invention as set forth in claim 10 wherein the forward cam is angled at least five degrees with respect to the fore-and-aft direction.

14. The invention as set forth in claim 13 wherein the doffer column for the forward drum is offset rearwardly and inwardly toward the row-receiving area as compared with the location of the doffer column relative to the rearward drum for reducing housing width requirements for containing the forward drum.

15. In a cotton harvester for harvesting cotton planted in rows, a row unit comprising:

a row unit housing defining a fore-and-aft extending row receiving area;

a forward and a rearward upright harvesting drum located on one side of the row receiving area for picking cotton from one side only of a row of cotton plants in the row-receiving area, the forward and rearward drums including upright picker bars rotatable about upright axes and supporting cotton picking spindles;

doffer columns supported adjacent the drums at locations offset from the row-receiving area for doffing cotton from the spindles, the columns and the row receiving areas defining intermediate transition areas;

forward and rearward horizontal cams located above the forward and rearward drums, respectively, for orienting the spindle bars about the upright axes, the cams being elongated in the fore-and-aft direction to define generally fore-and-aft extending axis; and wherein the picker bars include upper cam arms with rollers received by the cams, the aft portions of the rearward cam orient the spindle bars in the transition area, and wherein the roller for the picker bar of at least one of the drums is at the rearmost extremity of the aft portion as the bar moves into a position for doffing adjacent the doffer column.

* * * * *